(12) United States Patent
Ashizawa et al.

(10) Patent No.: US 6,724,444 B2
(45) Date of Patent: Apr. 20, 2004

(54) LIQUID CRYSTAL DISPLAY DEVICE

(75) Inventors: Keiichirou Ashizawa, Mobara (JP);
Hideki Kuriyama, Mobara (JP);
Takeshi Tanaka, Chiba (JP); Yuuichi Hashimoto, Mobara (JP); Mitsuo Nakatani, Mobara (JP)

(73) Assignee: Hitachi, Ltd., Tokyo (JP)

( * ) Notice: Subject to any disclaimer, the term of this patent is extended or adjusted under 35 U.S.C. 154(b) by 30 days.

(21) Appl. No.: 09/870,719

(22) Filed: Jun. 1, 2001

(65) Prior Publication Data

US 2001/0052951 A1 Dec. 20, 2001

(30) Foreign Application Priority Data

Jun. 2, 2000 (JP) ........................................ 2000-165449

(51) Int. Cl.⁷ ............................................... G02F 1/136
(52) U.S. Cl. .............................. 349/43; 349/42; 349/44; 349/38; 349/39; 349/48; 349/54; 349/55; 349/41
(58) Field of Search ............................. 349/42, 43, 38, 349/39, 138, 139, 123, 48, 54, 55, 41

(56) References Cited

U.S. PATENT DOCUMENTS

| | | | | |
|---|---|---|---|---|
| 5,151,806 A | * | 9/1992 | Kawamoto et al. | ............ 359/59 |
| 5,926,161 A | * | 7/1999 | Furuhashi et al. | .......... 345/100 |
| 6,016,174 A | * | 1/2000 | Endo et al. | .................... 349/43 |
| 6,157,428 A | * | 12/2000 | Koma | ......................... 349/138 |
| 6,249,325 B1 | * | 6/2001 | Ohkawara et al. | ............ 349/38 |
| 6,449,026 B1 | * | 9/2002 | Min et al. | ................... 349/141 |
| 6,489,952 B1 | * | 12/2002 | Tanaka et al. | .............. 345/205 |
| 6,504,585 B2 | * | 1/2003 | Ohkawara et al. | ............ 349/38 |

\* cited by examiner

*Primary Examiner*—Nathan J. Flynn
*Assistant Examiner*—Fazli Erdem
(74) *Attorney, Agent, or Firm*—Antonelli, Terry, Stout & Kraus, LLP

(57) ABSTRACT

In a liquid crystal display device having a thin film transistor in a pixel region thereof, the present invention arranges a semiconductor layer being located under a source electrode in the thin film transistor within a contour of a gate line (or a gate electrode of the thin film transistor) so as to suppress a photo conductive current in the semiconductor layer, or to prevent the source electrode from being broken at a position where the source electrode gets over the semiconductor layer.

8 Claims, 15 Drawing Sheets

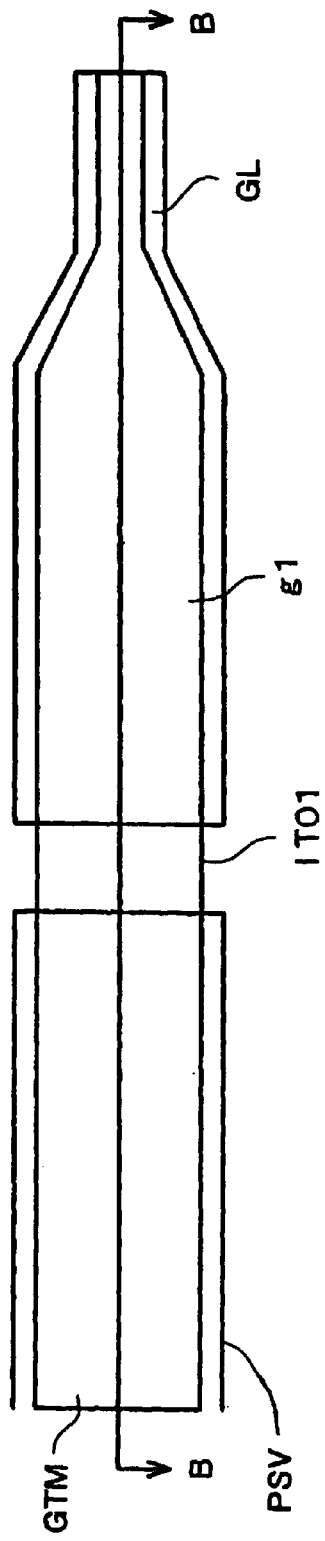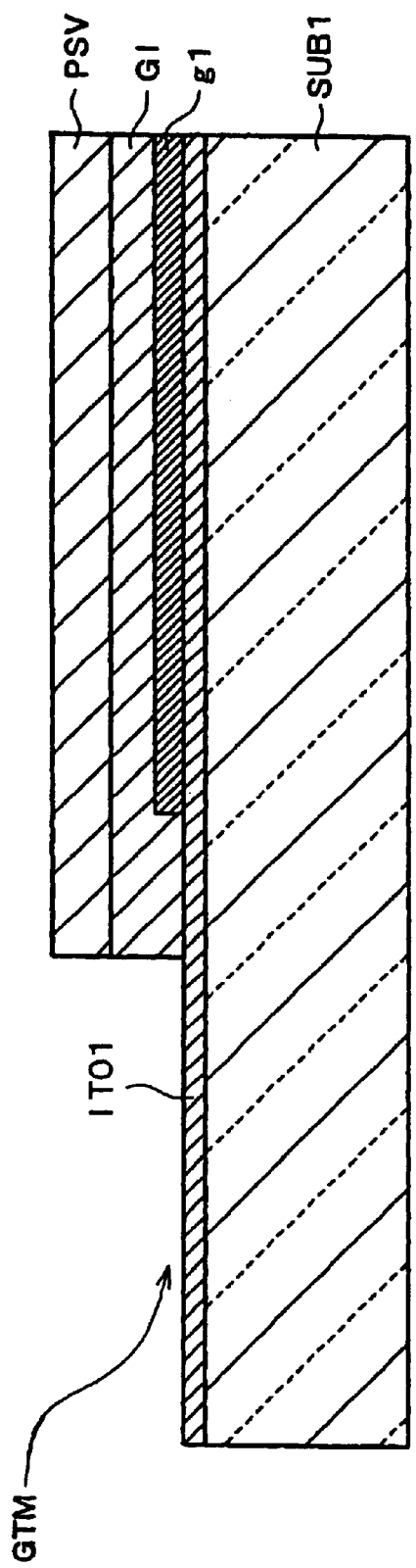

LIQUID CRYSTAL DISPLAY DEVICE

BACKGROUND OF THE INVENTION

1. Field of the Invention

The present invention relates generally to liquid crystal display devices and, more particularly, to liquid crystal display devices of the so-called active matrix type with switching elements being disposed in units of picture elements or "pixels."

2. Description of the Related Art

Liquid crystal display devices are typically designed to perform a display operation by applying an electric field to liquid crystal molecules of a liquid crystal layer that is interposed between a pair of substrates to thereby permit liquid crystals to change in orientation or "alignment" direction and then utilizing resultant optical changes of the liquid crystal layer occurred due to such alignment direction changes.

One typical prior known active-matrix type liquid crystal display device is the one of the twisted nematic (TN) type, wherein the direction of an electric field being applied to its liquid crystal layer is set at a specific direction that is substantially at right angles to surfaces of the substrates with the liquid crystal layer sandwiched therebetween for achievement of the intended display operation by utilization of optical rotary polarization of the liquid crystal layer.

On the other hand, liquid crystal display devices of the in-plane switching (IPS) scheme type are also proposed until today, which are designed to employ a comb-shaped electrode while letting the direction of an electric field applied to liquid crystals be substantially parallel to the substrate surfaces to thereby perform displaying by use of double refractivity of the liquid crystals. Typical ones of such devices have been disclosed, for example, in Japanese Patent Publication No. 21907/1988, U.S. Pat. No. 4,345,249, WO91/10936, and Japanese Patent Laid-Open No. 160878/1994.

This IPS scheme is distinguishable over the traditional TN scheme in that the former offers advantages including but not limited to wider viewing angles and lower load capacitances. Presence of such technical superiority permits the IPS scheme to be adaptable for use with new types of active-matrix liquid crystal display devices which are widely used in place of the TN scheme type ones.

In the IPS scheme, as apparent from M. Oh-e, M. Yoneda and K. Kondo, Journal of Applied Physics, Vol. 82, No. 2, 1997 at pp. 528–535, it is possible to almost perfectly realize the intended in-plane switching operation in cases where liquid crystals are designed to have negative polarity dielectric anisotropy, rather than positive dielectric anisotropy.

Currently available IPS liquid crystal display devices employ optically opaque metal comb-shaped electrodes of stripe shape as provided within the surface of one of the pair of substrates stated supra.

In recent years, another type of IPS scheme has been proposed which employs comb-shaped electrodes made of a transparent conductive material such as indium tin oxide (ITO) in place of opaque metal electrodes, which electrodes are laid out at selected pitches that are less in value than those used in the prior art IPS scheme, and further uses a chosen liquid crystal material whose dielectricity anisotropy is negative in polarity to thereby make it possible by use of only electric fields as created at edge portions of a comb electrode to cause all the liquid crystals existing on or over this transparent comb electrode to offer the required alignment changeability, thus improving both the optical transmissivity and aperture ratio thereof.

The above-noted proposal is disclosed, for example, in S. H. Lee, S. L. Lee and H. Y. Kim, "Asia Display," 1998 at pp. 371–374 and also in S. H. Lee, S. L. Lee, H. Y. Kim & T. Y. Eom, "SID Digest," 1999, pp. 202–205.

It is also reported in the above-identified technical documents that with the IPS scheme using in combination certain liquid crystal material of negative dielectricity anisotropy and short-pitch transparent comb electrodes, the transmissivity near in value to that in the TN scheme becomes available while retaining wide view-angle characteristics equivalent to those in the IPS scheme.

A liquid crystal display device of the type employing the above-discussed technology is arranged to comprise a plurality of gate lines (gate lead wires) and multiple drain lines (drain leads) formed on or over a substrate, and also to comprise switching elements' (typically, thin-film transistors, as the rest of the description as will be presented below assumes the use of such thin-film transistors) at cross-over points or "intersections" of the gate and drain lines, wherein more than one common electrode and pixel electrodes driven by the switching elements are disposed adjacent to each other.

A respective one of the thin-film transistors has its gate electrode formed of part of a gate line associated therewith, a drain electrode extended from its associative drain line, the drain electrode overlying the gate electrode with a semiconductive layer (amorphous silicon or "a-Si" layer) being interposed therebetween, and a source electrode for electrical connection to a pixel electrode. Note here that although the drain electrode and the source electrode are functionally interchangeable during an operation of the thin-film transistor, the following explanation will be given fixedly as shown in drawings to be presented later.

FIG. 17 is a diagram showing an enlarged plan view of a main part of a thin-film transistor in one exemplary IPS scheme liquid crystal display device. In FIG. 17, "GL" is used to designate a gate line; DL indicates a drain line; ASI denotes a semiconductor layer (amorphous silicon gr "a-Si" layer, also called a-Si island in some cases); PX denotes a pixel electrode; and CT denotes a common electrode. The element SD1 is a source electrode, whereas the element SD2 is a drain electrode. In this liquid crystal display device, the pixel electrode PX and common electrode CT are disposed over a thin-film transistor substrate in such a manner that these elements are in close proximity in position relative to each other. The source electrode SD1 and pixel electrode PX of the thin-film transistor are connected together via a through-hole TH.

In addition, FIG. 18 is a main part plan view diagram pictorially depicting a thin-film transistor portion in another example of the IPS liquid crystal display device. In FIG. 18 the same reference characters as those used in FIG. 17 designate the same functional parts or components. In this liquid crystal display device, the pixel electrode PX is formed directly on the thin-film transistor substrate, whereas the common electrode CT is formed to overlie the pixel electrode PX with a dielectric layer interposed therebetween. The source electrode SD1 is formed at the same layer level as the pixel electrode PX. The source electrode SDI of the thin-film transistor is connected to the pixel electrode PX via a through-hole TH.

Another structure is available, which is designed so that the common electrode CT is formed directly on the thin-film transistor substrate while letting the pixel electrode PX be formed thereover with a dielectric layer sandwiched therebetween. Still another one is also under consideration, which is arranged so that the shape of at least one of the pixel electrode PX and common electrode CT is bent or flexed in either a longitudinal direction or lateral direction.

SUMMARY OF THE INVENTION

With any one of the liquid crystal display devices shown in FIGS. 17 and 18 also, the semiconductor layer ASI to be formed over the gate line GL is oversized and extruded from the gate line GL at portions underlying the source electrode SD1 (i.e. the portions surrounded by circles "A" in FIGS. 17–18). When back-light rays reach and fall on such extruded portions of this semiconductor layer ASI, what is called the photoconduction current—also known as photoconductivity current in some cases—might be generated, resulting in creation of current leakage at the thin-film transistor, or alternatively a potential decrease occurs in signal hold/retention voltage. Generally this "photocon" current is derived due to, for example, an increase in conductivity of the semiconductor and/or the so-called intrinsic photoconductivity of the semiconductor which can take place due to the fact that rays of light incident on the semiconductor go beyond the forbidden band (band gap) of the semiconductor causing charge carriers to be produced inside thereof.

In addition, since contact portions (those surrounded by circles "B" in FIGS. 17–18) of the source electrode SD1 and the semiconductor layer ASI's sidewalls are positionally adjacent to the thin-film transistor's channel section (part "C" in FIGS. 17–18), hole injection can occur resulting also in creation of current leakage at the thin-film transistor and/or in signal retention voltage deterioration.

Furthermore, either the source electrode (or part for use as the source electrode of pixel electrode PX) SD1 or drain electrode as formed over the semiconductor layer ASI is such that electrical resistivity increases and/or open-circuiting would readily take place due to creation of cracks as resulted from the presence of a stair-step like difference or convexo-concave surface configuration of certain portions (edges of the source electrode SDI as surrounded by circles "A" or "B" in FIGS. 17–18) at which the electrode gets over the semiconductor layer ASI.

It should be noted that the above-discussed phenomena will also occur in TN type liquid crystal display devices, wherein the photocon current generation, thin-film transistor leak current production and/or signal retention voltage reduction might affect resultant brightness or illuminance in such liquid crystal display devices, which leads to a decrease in quality of on-screen display images. Additionally cracking and/or open circuiting of source/drain electrodes can result in a decrease in manufacturing yield of products. Thus, a need is felt to avoid these problems faced with the above-noted devices.

It is therefore a primary object of the present invention to provide a new and improved liquid crystal display device capable of avoiding the problems to thereby offer increased illuminance and enhanced operation reliability.

For resolving the aforementioned problems, in a liquid crystal display device, the present invention arranges a semiconductor layer being situated under a source electrode of a thin film transistor over a gate line (a gate electrode of the thin film transistor) so as not to protrude from the gate line, or expands a distance between a channel portion of the thin film transistor (formed of a part of the semiconductor layer) and a side wall of the source electrode at a portion thereof getting over (getting onto) the semiconductor layer. According to at least one of these features, the photoconductive current is suppressed.

Namely, one example of liquid crystal display devices according to the present invention comprises: a pair of substrates at least one of which is transparent and between which a liquid crystal layer is interposed; a plurality of gate lines and a plurality of drain lines being formed on an inner surface of one of the pair of substrates; a thin film transistor being disposed at an intersecting portion of one of the plurality of gate lines and one of the plurality of drain lines; a pixel electrode being connected to the thin film transistor; and a counter electrode being disposed opposite to the pixel electrode, wherein an edge portion of a semiconductor layer situated under a source electrode of the thin film transistor is arranged within an edge of the gate line situated under the semiconductor layer.

Moreover in the aforementioned liquid crystal display device, a width of the semiconductor layer situated under the source electrode is broader than that of the source electrode.

Incidentally in the aforementioned liquid crystal display device, the semiconductor layer provided for the thin film transistor (the aforementioned semiconductor layer having a portion utilized for a channel of the thin film transistor) is separated from another semiconductor layer disposed at the intersection portion of the gate line and the drain line (e.g. a semiconductor layer other than the aforementioned semiconductor layer extending along the drain line), so as to prevent the photoconductive current generated at the latter semiconductor layer from flowing from the intersection portion into the thin film transistor.

A drain electrode of the aforementioned thin film transistor should branch off from the aforementioned one of the plurality of drain lines at a location outside a gate electrode of the thin film transistor (e.g. the gate line situated under the aforementioned former semiconductor layer utilized as a channel of the thin film transistor), cover a corner of the semiconductor layer at a side of the one of the plurality of drain lines, and extend over the semiconductor layer. In this structure, the semiconductor layer should have so-called two directional getting over portion where the drain electrode gets over (onto) an edge of the semiconductor layer in two different directions with respect to an extension direction of the drain electrode.

Furthermore, the semiconductor of the thin film transistor should comprise a portion having two-or-three different edges (sides) thereof under at least one of the drain electrode and the source electrode of the thin film transistor. Since the drain electrode or the source electrode gets over or onto these two-or-three different edges along an extension direction of thereof, the portion of the semiconductor layer is called a two directional getting over portion or a three directional getting over portion in accordance with a number of edges of the semiconductor layer under the drain electrode or the source electrode. The two-or-three directional getting over portion prevents the source electrode or the drain electrode from being cracked or broken.

Describing a liquid crystal display device according to the present invention from another viewpoint, the liquid crystal display device comprises:

a pair of substrates at least one of which is transparent and between which a liquid crystal layer is interposed;

a plurality of pixel regions being disposed in a matrix manner along a first direction and a second direction transverse to the first direction on an inner surface of one of the pair of substrates, each of which has a gate electrode, an insulating layer being formed over the gate electrode, a semiconductor layer being formed on the insulating layer, source and drain electrodes being formed on the semiconductor layer and spaced from one another, and a pixel electrode being connected to one of the source and drain electrodes;

a plurality of gate signal lines respective one of which is connected to the gate electrode of each of the pixel regions being arranged along the first direction; and a plurality of video signal lines respective one of which is connected to another of the source and drain electrodes of each of the pixel regions being arranged in the second direction, wherein the semiconductor layer is formed within a contour of the gate electrode in each of the pixel regions.

In the liquid crystal display device of this sort, each of the plurality of video signal lines are formed on another semiconductor layer being formed so as to be spaced from the semiconductor layer of each of the pixel regions, for example.

Moreover, applying the present invention may be applied to TN-type (Twisted Nematic-type) liquid crystal display device by providing a counter electrode on an inner surface of another of the pair of substrates so that each of the pixel electrodes is opposite to the counter electrode across the liquid crystal layer.

These and other objects, features and advantages of the present invention will become more apparent from the following description when taken in conjunction with the accompanying drawings.

These and other objects, features and advantages of the present invention will become more apparent from the following description when taken in conjunction with the accompanying drawings.

BRIEF DESCRIPTION OF THE DRAWINGS

FIG. 10A is a diagram showing a cross-section of part of the display panel PNL which is near an external connection terminal GTM to which scanning circuitry of the panel is to be connected whereas

FIGS. 11A and 11B are explanation diagrams of a connection structure covering from a gate line GL up to its associated external connection terminal (gate terminal) GTM in FIG. 9, wherein FIG. 11A shows a planar structure thereof whereas FIG. 11B depicts a sectional view of the structure as taken along line B—B of FIG. 11A;

FIGS. 12A and 12B are explanation diagrams of a connection structure covering from a drain line DL to its associated external connection terminal (drain terminal) DTM, wherein FIG. 12A shows a planar structure thereof whereas FIG. 12B depicts a sectional view of the structure as taken along line B—B of FIG. 12A;

FIGS. 13A and 13B are explanation diagrams of a connection structure covering from a common line CL to its associated external connection terminal CTM, wherein FIG. 13A shows a planar structure thereof whereas FIG. 13B depicts a sectional view of the structure as taken along line B—B of FIG. 13A;

DETAILED DESCRIPTION

Figure 1:
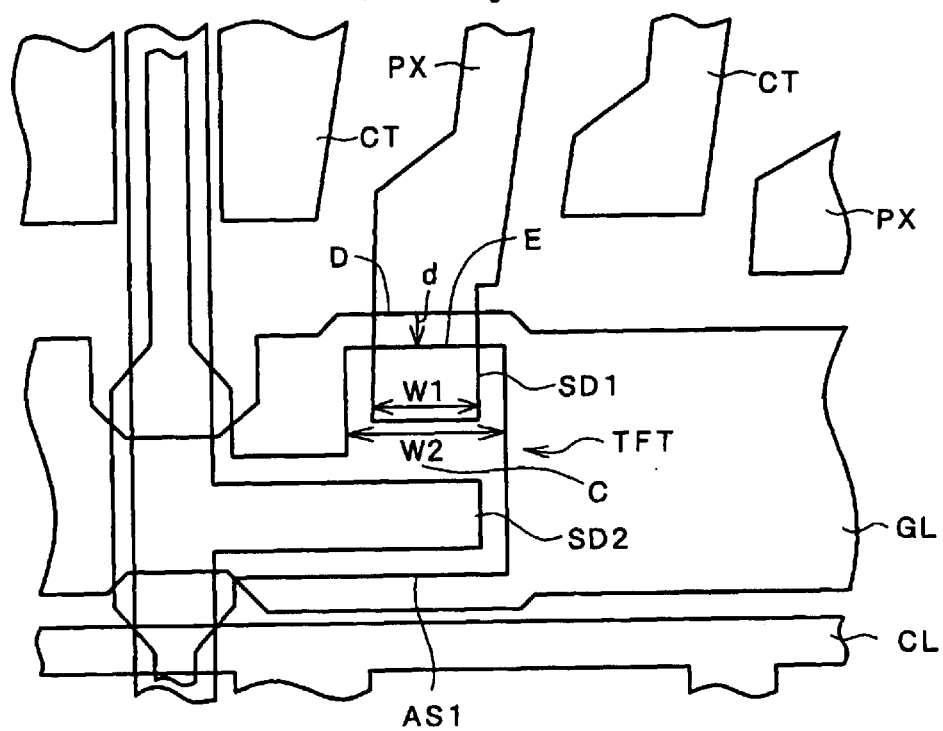
FIG. 1 is a diagram schematically showing a plan view of a configuration of main part of a liquid crystal display device in accordance with a first embodiment of the present invention.

Several preferred embodiments of the present invention will now be described in detail with reference to the accompanying drawings. Note that although certain embodiments with the principles of the invention being applied to IPS type liquid crystal display devices will be set forth herein, the same goes with liquid crystal display devices of the TN type. Also note that parts or components with the same functionalities are identified by the same reference characters and that any repetitive explanation will be omitted.

Referring to FIG. 1, there is schematically shown a plan view of the configuration of a main part of a liquid crystal display device in accordance with a first embodiment of the present invention, which part includes a thin-film transistor (TFT) section. As shown in FIG. 1, gate lines (gate lead wires, also known as scan signal lines or horizontal signal lines) GL, drain lines (drain lead wires, also called video signal lines or vertical signal lines) DL, and common lines (common leads, also called counter electrode lead wires) CL are provided on a substrate, and a respective one of the thin film transistor sections are disposed at or within cross-over (or "intersection") region of two neighboring drain lines DL and two gate lines GL.

The gate line GL and common line CL extend in a lateral direction of FIG. 1, and a plurality of such lines are disposed in upward/downward directions. The image signal line DL extends in the up-down directions, and a plurality of similar lines are disposed in the lateral direction. Within a single pixel, one or a plurality of "branch" line segments of a common electrode CT is/are disposed in such a manner as to be diverted from the common line CL. This common line CL should not be limited only to the one that is disposed adjacent to the gate line GL as shown in FIG. 1, and there is also the one that is disposed at a central portion of the pixel.

A comb-shaped pixel electrode PX is formed of a transparent conductive film made of ITO and is electrically connected to a source electrode SD1 of the thin-film transistor TFT in a way such that it is continuous with the source electrode SD1 or alternatively coupled via a though-hole. "SD2" is a drain electrode, which is laterally diverted from the drain line DL. "ASI" is an a-Si semiconductor layer.

An electric field created between each pixel electrode PX and common electrode CT is used to control the optical state of a liquid crystal material LC, thereby performing any intended display operation.

The gate line GL is for transmission of a scan voltage signal to the thin-film transistor TFT of each pixel; the drain line DL is for supplying an image signal voltage to the pixel electrode PX of each pixel through a drain electrode SD2 of the thin-film transistor TFT; and, the common line CL is for supplying a common voltage signal to the common electrode CT of each pixel.

In FIG. 1, the common line CL formed of a metal electrode is formed to surround the side part of drain line DL and thus functions also as an optical shield layer that prevents unnecessary light leakage at the drain line side part, which would take place upon influence of an electric field that generates due to the presence of a potential difference due to a voltage being applied to the drain electrode DL.

The comb-shaped pixel electrode PX has its electrode width W and electrode distance or pitch L, which are changeable depending upon the liquid crystal material used. This is required, in view of the fact that the electric field intensity for achievement of maximal transmissivity is different among liquid crystal materials, to set up the electrode pitch in accordance with the liquid crystal material to thereby let the maximal transmissivity be obtainable within a maximum amplitude range of a signal voltage as will be set by the withstanding or breakdown voltage of a drain signal drive circuit (signal side driver) used.

While the distance between adjacent pixel electrodes is typically set to fall within a range of from 1 to 15 μm, it is set at 4 μm in this embodiment in order to realize the required response rate of 50 msec. In addition, while the electrode pitch L is set to fall within a range of 1 to 10 μm, it is set to range from 5 to 10 μm in this embodiment in order to realize a drive voltage of 10 V or less.

In this embodiment, an edge portion E of the semiconductor layer ASI which is placed under the source electrode SD1 making up the thin-film transistor TFT is disposed within an edge D of the gate line GL that is located under the said semiconductor layer ASI. More specifically, the semiconductor layer ASI is prevented from extruding from the gate line GL to thereby prevent back-light rays from reaching the semiconductor layer ASI, thus suppressing photoconduction or "photocon" currents.

Additionally, let a width w2 of the semiconductor layer ASI be greater than a width w1 of the source electrode SD1 at a portion whereat the source electrode SD1 of the thin-film transistor TFT overlaps the semiconductor layer ASI.

With such an arrangement, the distance between a channel section C of the thin-film transistor TFT and a contact portion of the sidewall E at which the source electrode SD1 "get" over the semiconductor layer ASI is made greater to suppress hole injection whereby any leak current of the thin-film transistor decreases so that reduction of signal retention is precluded.

Figure 2:
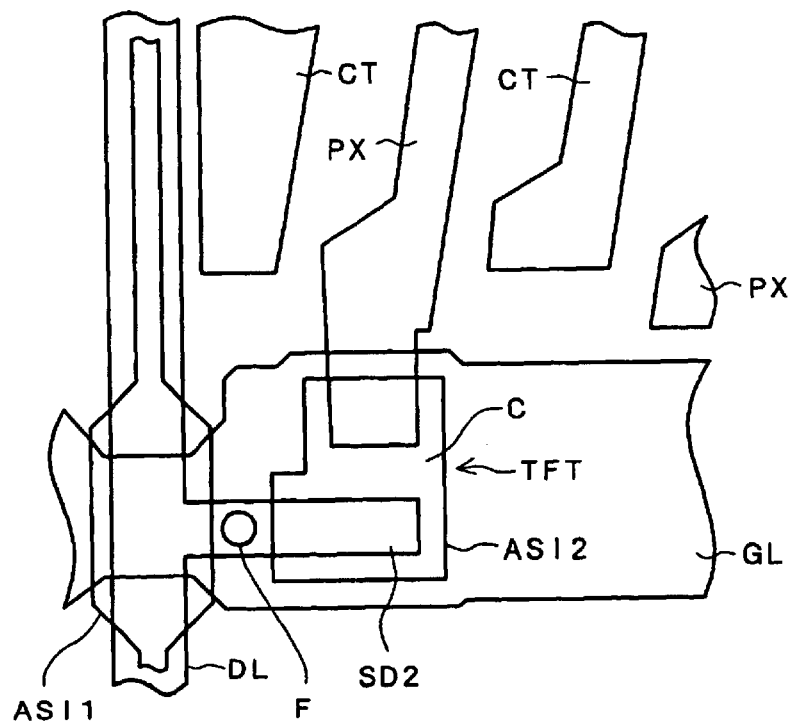
FIG. 2 is a diagram pictorially depicting a plan view of a configuration of main part of a liquid crystal display device in accordance with a second embodiment of this invention.

FIG. 2 is a diagram pictorially depicting a plan view of a main part configuration of a liquid crystal display device in accordance with a second embodiment of this invention, wherein the same function portions as those in FIG. 1 are added the same reference characters. Note that illustration of the common line CL is eliminated herein.

In the illustrative embodiment, a semiconductor layer at the intersection of a gate line GL and drain line DL is separated from the semiconductor layer of a thin-film transistor TFT to provide separate semiconductor layers ASI1, ASI2. With this arrangement, it becomes possible to prevent a photoconduction current produced at the intersection of the gate line GL and drain line DL from affecting the thin-film transistor TFT.

Figure 3A:
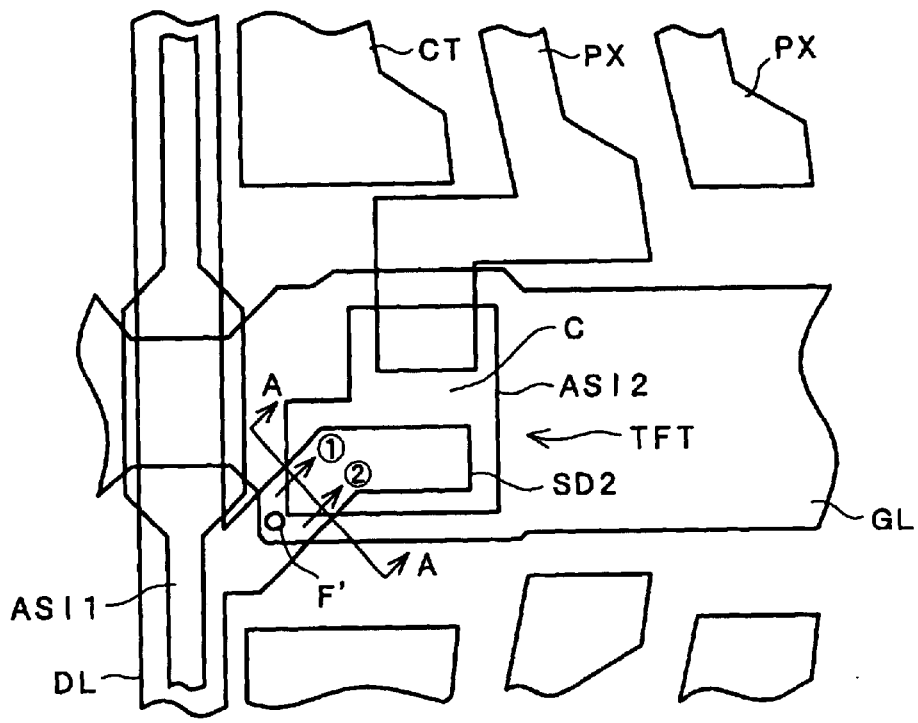
FIG. 3A is a diagram depicting a plan view of a configuration of main part of a liquid crystal display device in accordance with a third embodiment of the invention.
Figure 3B:
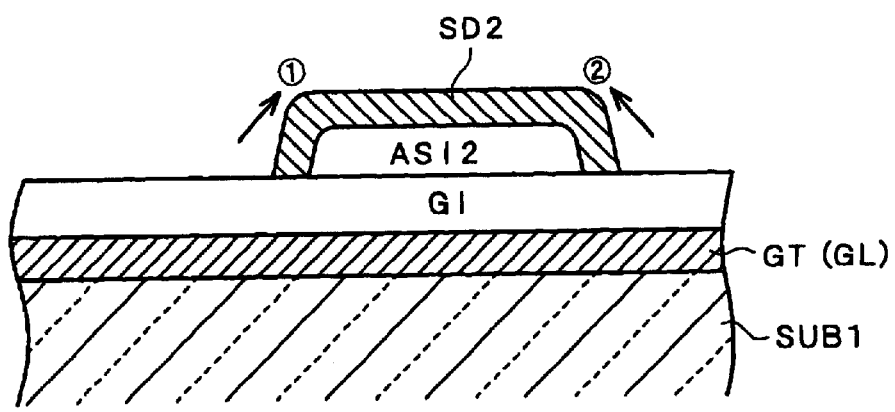
FIG. 3B shows a cross-sectional view of the structure of FIG. 3A as taken along line A—A therein.

FIG. 3A is a plan view diagram of a main part configuration of a liquid crystal display device in accordance with a third embodiment of the invention, and FIG. 3B shows a cross-sectional view of the structure of FIG. 3A as taken along line A—A thereof. The same reference characters are added to the same function portions as those in FIG. 2. An illustration of the common line CL is eliminated herein. Arrows ① and ② designate specific directions in which the drain electrode SD2 gets over a semiconductor layer ASI2.

This embodiment is the same as the second embodiment in that the semiconductor layer at the intersection of gate line GL and drain line DL is separated from the semiconductor layer of the thin-film transistor TFT to provide separate semiconductor layers ASI1, ASI2. At this time, mere use of the arrangement of FIG. 2 would result in risks of electrical disconnection or open-circuit occurring due to unwanted crackability because of the fact that the portion whereat the drain electrode SD2 gets over and rides onto the semiconductor layer ASI2 is a one-directional getting-over portion.

In this embodiment, the above-noted branch portion of the drain SD2 which is diverted from the drain line DL and then extends over the semiconductor layer ASI2 of the thin-film transistor TFT is disposed at a selected portion that is off from the gate line GL. In addition the drain electrode SD2 is disposed so that it covers the drain electrode SD2 side corner of the semiconductor layer ASI2 of thin-film transistor TFT while forming a two-directional getting-over portion at the get-over portion of the semiconductor layer ASI2 of the drain electrode SD2 as shown in FIG. 3B, thereby suppressing occurrence of opencircuit.

Further, it is possible to increase the distance between the getting-over portion of the semiconductor layer ASI2 of this drain electrode SD2 and the channel section C of the thin-film transistor TFT, which in turn makes it possible to suppress any possible degradation in signal hold/retention characteristics of the thin-film transistor TFT otherwise occurring due to hole injection.

Further note that although in FIG. 2 a portion F whereat any semiconductor layer is absent is generated between the gate line GL and drain electrode SD2 resulting in an increase in capacitance of the portion, the arrangement of this embodiment is such that a portion F' decreases in area as shown in FIG. 3A to thereby suppress the capacitance increase.

Figure 4A:
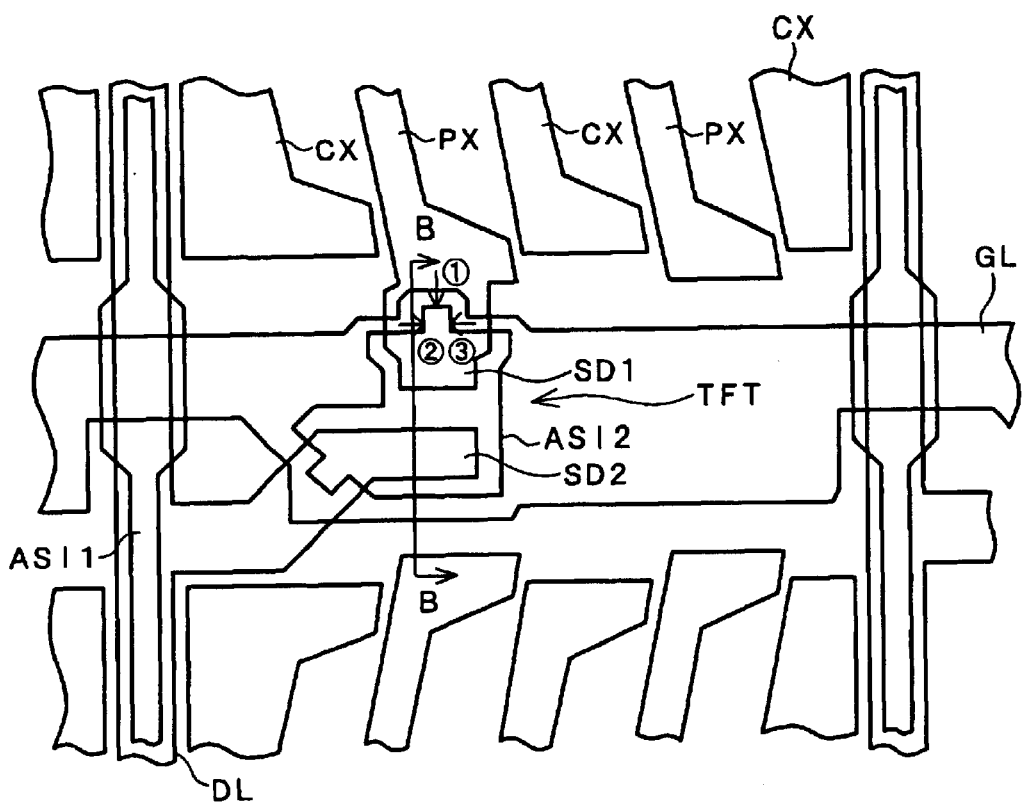
FIG. 4A is a diagram depicting a plan view of a main part configuration of a liquid crystal display device in accordance with a fourth embodiment of the invention.
Figure 4B:
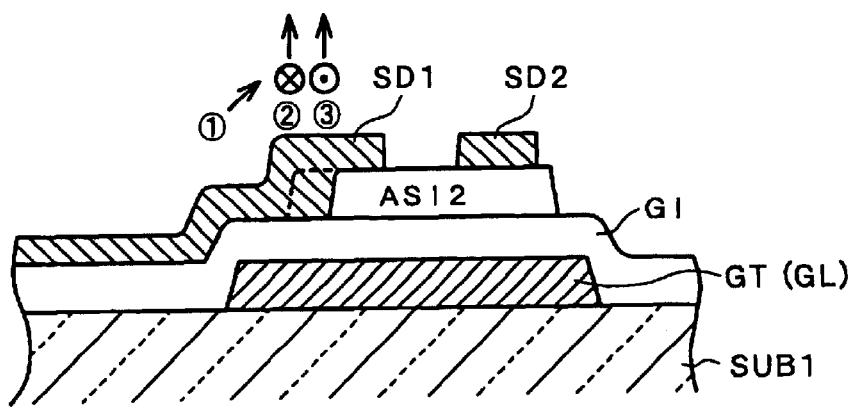
FIG. 4B shows a sectional view of the structure of FIG. 4A as taken along line B—B therein.

FIG. 4A is a diagram depicting a plan view of a main part configuration of a liquid crystal display device in accordance with a fourth embodiment of the invention, and FIG. 4B shows a sectional view of the structure of FIG. 4A when looking at from line B—B in a direction indicated by arrows. The same functional components as those shown in FIGS. 3A and 3B are added the same reference characters. An illustration of the common line CL is eliminated herein. Arrows ①, ② and ③ designate the directions in which the source electrode SD1 gets over the semiconductor layer ASI2, respectively.

This embodiment is arranged so that a three-directional get-over portion is formed at part whereat the source electrode SD1 and drain electrode SD2 get over the semiconductor layer ASI2 to thereby suppress occurrence of any opencircuit. While the three directional get-over portion will be explained here in conjunction with a get-over portion of the source electrode SD1 and semiconductor layer ASI2 over the gate line GL, the same goes with a get-over portion of the drain electrode SD2 and semiconductor layer ASI2.

As shown in cross-section in FIG. 4B, the source electrode SD1 is formed to get or "climb" over the gate line GL and a gate insulation layer G1 and also the semiconductor layer ASI2. With such a multi-stage climb-over structure, cracks will possibly occur at the climb-over portion of the source electrode SD1, causing opencircuit to readily take place.

With this embodiment, the gate line GL is projected toward the pixel electrode PX side while also forming another projection at such portion of the semiconductor layer ASI2 with the source electrode SD1 being disposed over this projection to thereby provide a specific portion—say, three-directional get-over portion—at which the source electrode SD1 gets over this projection (in other words, climbs and rides onto an edge of the projection) in three different directions of arrows ① to ③ shown in FIGS. 4A and 4B with respect to the extension direction thereof (in FIG. 4A, the longitudinal direction).

Letting the source electrode SD1 be disposed to get over the semiconductor layer ASI2 in three different directions as shown in FIG. 4B makes it possible to reduce the opencircuit occurrence rate of the source electrode SD1.

Figure 5:
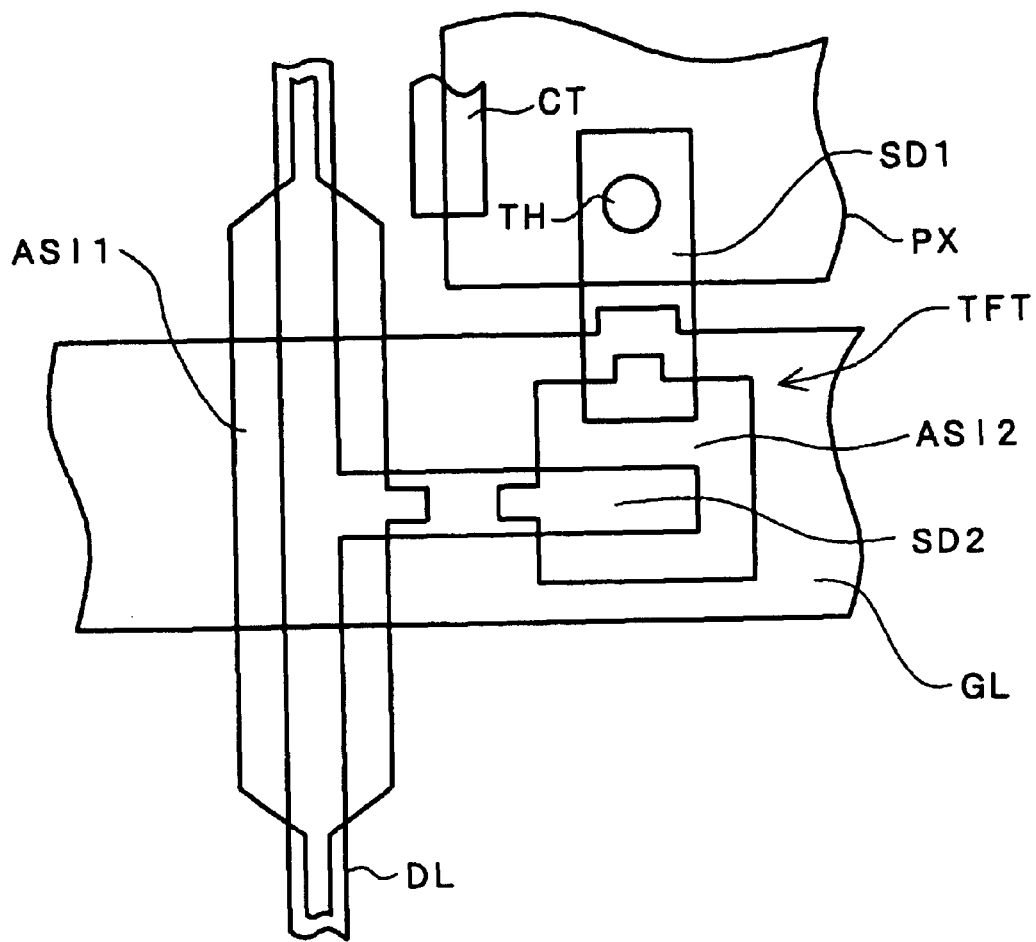
FIG. 5 depicts a plan view of main part of a liquid crystal display device in accordance with a fifth embodiment of the invention.

FIG. 5 depicts a plan view of main part of a liquid crystal display device in accordance with a fifth embodiment of the invention. This embodiment is arranged so that the semiconductor layer ASI2 of a thin-film transistor TFT is separated from the semiconductor layer ASI1 at the intersection of a gate line GL and drain line DL to thereby offer similar effects to the second embodiment as has been explained with reference to FIG. 2.

And three-directional get-over portions each similar to that shown in FIG. 4A are formed at a portion at which the drain electrode SD2 gets over the semiconductor layers ASI1 and ASI2 and a portion whereat the source electrode SD1 climbs over the gate line and semiconductor layer ASI2.

In accordance with this embodiment, it is possible to reduce the opencircuit occurrence rate at the portions whereat the drain electrode SD2 and source electrode SD1 get over the semiconductor layers ASI1, ASI2 in a way similar to that of the fourth embodiment, which in turn makes it possible to prevent resistance value increase and opencircuit occurrence.

An explanation will next be given of other arrangement examples of the liquid crystal display device of the present invention with reference to FIGS. 6 to 14 below.

Figure 6:
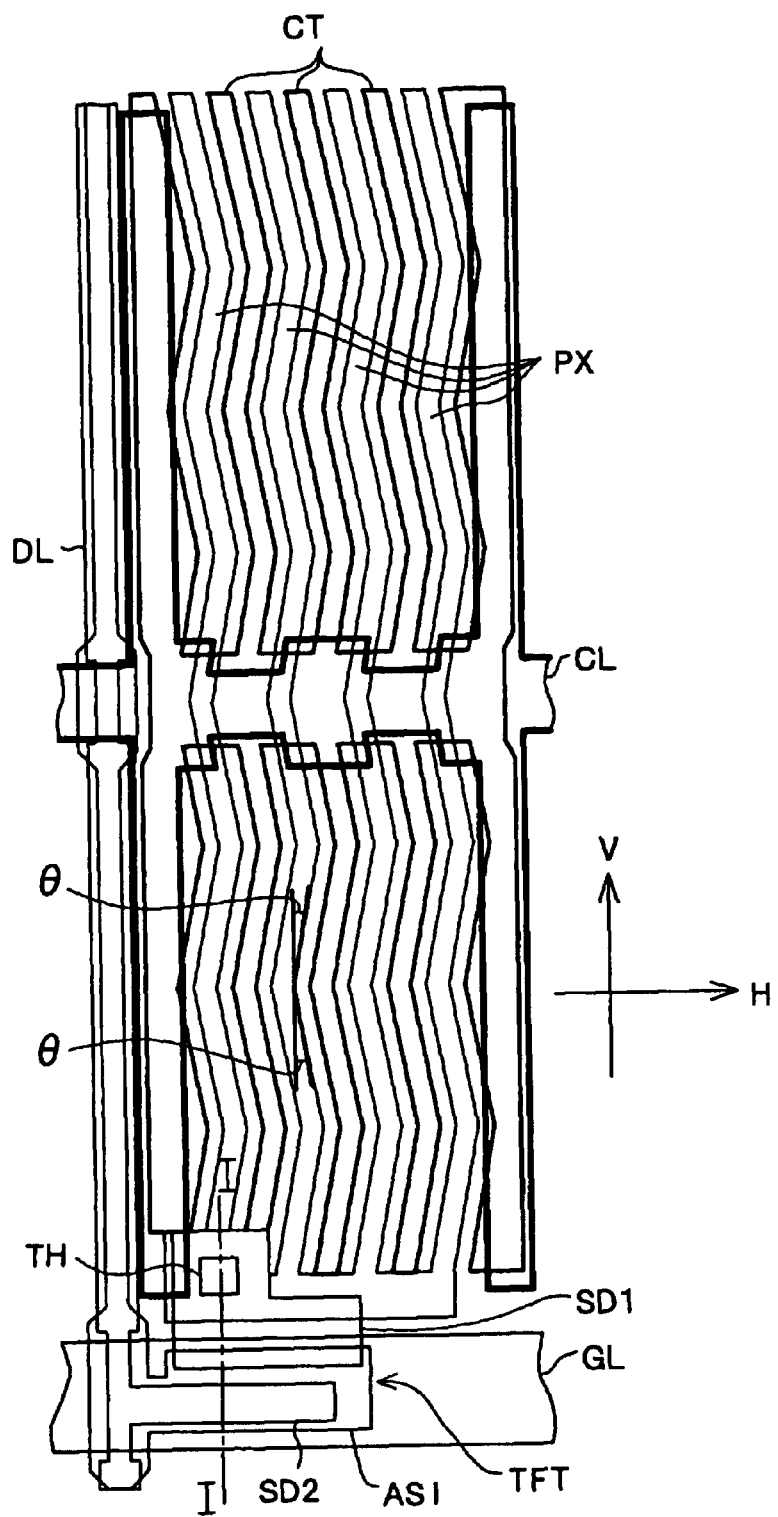
FIG. 6 is a plan view of a configuration of one pixel in the liquid crystal display device embodying the invention.

FIG. 6 is a plan view of a configuration of one pixel in the liquid crystal display device embodying the invention. In FIG. 6, "GL" designates a gate line; DL indicates a drain line; CL denotes a common line; CT is a common electrode; PX, a pixel electrode; TH, a through-hole for connection between the source electrode SD1 of a thin-film transistor TFT and the pixel electrode PX; V, longitudinal (up-down) direction; H, lateral (right-left) direction.

In this liquid crystal display device shown herein, the pixel electrode PX and counter electrode CT are each formed to have a triangular wave-like pattern (zig-zag shape). Whereby, two regions (domains) having direction-different realignment states are formed so that respective ones mutually compensate for diagonal coloring and gradation inversion therebetween, thus enabling achievement of wide view angles.

More specifically, respective electrodes each have a zig-zag shape with a plurality of bent portions in the running direction thereof, wherein with its bent portion being as a boundary, one of them has an angle of θ with respect to the coordinate axis V in the longitudinal direction shown in FIG. 6 whereas the other has an angle of 180°−θ.

With such an arrangement, two regions (domains) having direction-different realignment states are thus formed so that respective ones mutually compensate for diagonal coloring and gradation inversion therebetween, thereby making it possible to achieve wider view angles.

Note here that a gate insulation film GI is formed between the pixel electrode PX and the counter electrode CT, causing an electric field in a lateral direction to be created between the pixel electrode PX and counter electrode CT for letting liquid crystal molecules rotate.

An amorphous semiconductor layer ASI is disposed between a drain electrode SD2 being formed from the drain line DL to overlap the gate line GL and a source electrode SD1 that is connected to the pixel electrode PX for application of a retention voltage to the pixel electrode PX whereby it functions as the thin-film transistor TFT.

Figure 7:
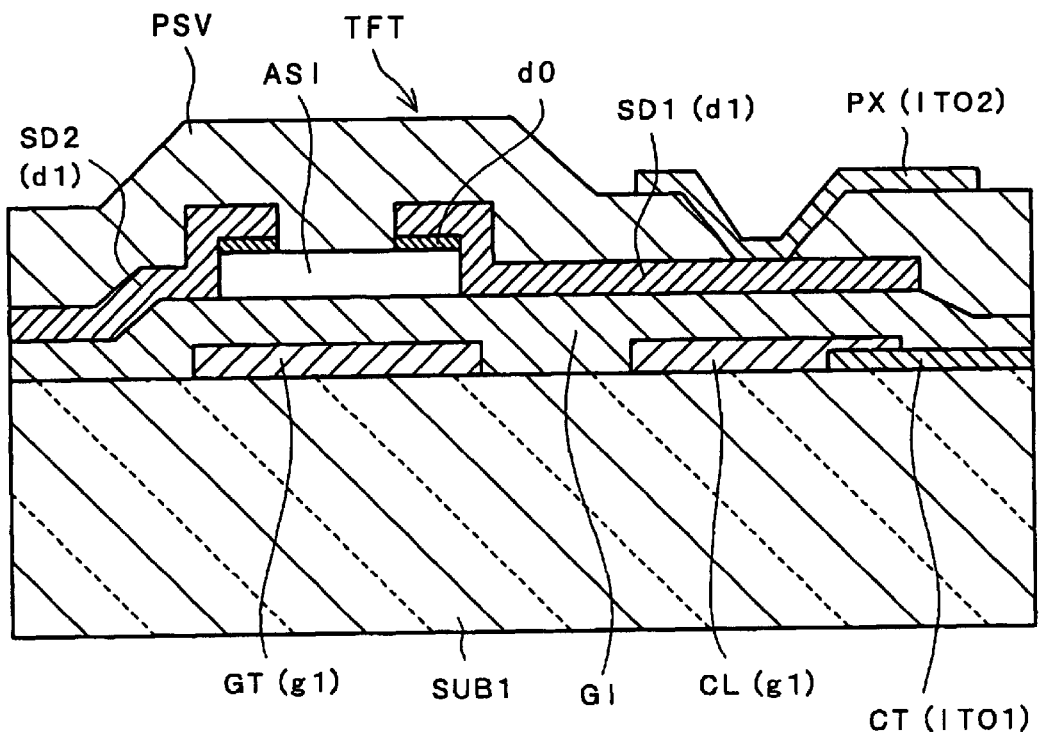
FIG. 7 is a sectional view of a thin-film transistor section.

FIG. 7 is a sectional view of the thin-film transistor part taken along line I—I of FIG. 6. The thin-film transistor TFT operates in such a way that when applying a positive bias to the gate electrode GT thereof, the resultant channel resistivity between the source and drain gets smaller; upon setting the bias at zero, the channel resistivity increases in value.

The thin-film transistor TFT has its gate electrode GT, gate insulation film GI, intrinsic (i) type semiconductor layer ASI made of silicon (Si) doped with no conductivity determining impurities, and a pair of electrodes (source electrode SD1 and drain electrode SD2).

It should be noted that the source electrode SD1 and drain electrode SD2 are inherently determined depending on the bias polarity therebetween and that, in the circuitry of this liquid crystal display device, such polarity is invertable during operation causing the source electrode SD1 and drain electrode SD2 to interchange during operation as has been stated supra.

The gate electrode GT is formed so that it is continuous with a gate signal line GL, a partial region of which is designed to become the gate electrode GT.

Here, the gate electrode GT is formed of a single-layered conductive film g1. This conductive film g1 may typically be a sputter-fabricated chromium-molybdenum (Cr—Mo) alloy film although the invention should not be limited thereto. Two layers of different metals may also be formed.

The gate line GL is formed of a conductive film g1. This gate line GL's conductive film g1 is fabricated during the same manufacturing process step as the conductive film g1 of the gate line GL in such a manner that the former is arranged to be integral with the latter.

With this gate line GL, a gate voltage is supplied to the gate electrode GT from external circuitry. The conductive film g1 may be a sputter-fabricated chromium-molybdenum (Cr—Mo) alloy film by way of example.

Additionally the materials of the gate line GL and gate electrode GT should not be limited only to chromium-molybdenum (Cr—Mo) alloys; for example, each may be designed to have a double-layer structure with either aluminum or aluminum alloy being wrapped with the chromium-molybdenum (Cr—Mo) alloy for achievement of lower resistivity.

The common line CL is formed of a conductive film g1. This conductive film g1 of the common line CL is fabricated during the same manufacturing process step as the conductive films g1 of the gate electrode GT and gate line GL plus common electrode CT in such a manner as to be formed integrally with the common electrode CT. With this common voltage signal line CL, a common voltage is supplied to the common electrode CT from the external circuitry.

Additionally the material of the common line CL should not be limited only to the chromium-molybdenum (Cr—Mo) alloy; for example, it may be designed to have a double-layer structure with either aluminum or aluminum alloy being wrapped with the chromium-molybdenum (Cr—Mo) alloy for achievement of lower resistivity.

The gate insulation film GI is for use in the thin-film transistor TFT as a dielectric film for giving an electric field to the semiconductor layer ASI together with the gate electrode GT. The gate insulation film GI is formed over the gate electrode GT and gate line GL.

One example of this gate insulation film GI is a silicon nitride film as formed by chemical vapor deposition (CVD) techniques to a thickness ranging from 100 nanometers (nm) to 4 micrometers ($\mu$m)—here, 350 nm or more or less. The gate insulation film GI serves also as an interlayer dielectric film between the gate line GL and common line CL and drain line DL, and also contributes to establishment of electrical isolation therebetween.

The semiconductor layer ASI is made of amorphous silicon semiconductor material as formed to a thickness of from 150 to 2,500 Angstroms (Å)—here, about 1200 Å. A layer d0 is an N+ type amorphous silicon semiconductor layer heavily doped with an impurity of phosphorus (P) for ohmic contact, which is left only at selected part whereat the i-type semiconductor layer ASI is present thereunder and a conductive layer d1 exists thereover.

The semiconductor layer ASI and layer d0 are also provided between the both intersections or cross-over portions of the gate line GL and common line CL and the drain line DL. The semiconductor layer ASI of the intersections is for suppression of short-circuiting between the gate line GL and common line CL and the drain line DL at the intersections.

A respective one of the source electrode SD1 and drain electrode SD2 is constituted from a conductive film d1 that is in contact with the N+ type semiconductor layer do. Since Cr—Mo film is less in stress force, it is capable of being formed to an increased thickness, which in turn contributes to achievement of lower lead wire resistivities. In addition, the Cr—Mo is also excellent in adhesive properties with respect to the N+ type semiconductor layer d0.

The drain line DL is arranged by the same layer as the source electrode SD1 and drain electrode SD2. Additionally the drain line DL is formed integrally with the drain electrode SD2.

Here, as the conductive film d1, a sputter-formed chromium-molybdenum (Cr—Mo) alloy film is used, which is formed by sputtering to a thickness of 500 to 3,000 Å (here, about 2,500 Å). Since the Cr—Mo film is less in stress force, it is capable of being formed to an increased thickness, which in turn contributes to achievement of lower lead wire resistivities.

Additionally the Cr—Mo film is also excellent in adhesive properties with respect to the N+ type semiconductor layer d0. Typical examples of the conductive film d1 other than the Cr—Mo film are high-melting-point metal (Mo, Ti, Ta, W) films and high-melting-point metal silicide ($MoSi_2$, $TiSi_2$, $TaSi_2$, $WSi_2$) films. Optionally a multilayer structure with aluminum or else is also employable.

A protective film PSV is provided over the thin-film transistor TFT. The protective film PSV is provided mainly for protection of the thin-film transistor TFT against moisture or else and is thus made of chosen materials high in transparency and yet excellent humidity resistivity.

Preferred examples of the protective film PSV are a silicon oxide film and silicon nitride film as formed by plasma CVD apparatus to a predetermined thickness of 0.1 to 1 $\mu$m. The protective film PSV has been selectively removed so as to expose external connection terminals DTM, GTM.

The thickness settings of the protective film PSV and gate insulation film GI are as follows: the former is relatively thickly formed in view of the required protection effects whereas the latter is made thinner in light of the mutual conductance gm of the transistor. Alternatively it will also be permissible that the protective film PSV be constituted from a multilayer structure having more than one relatively thick organic film made of polyimide or the like with a thickness ranging from 2 to 3 $\mu$m.

The pixel electrode PX is made of a chosen transparent conductive material such as indium-tin-oxide (ITO) and forms a storage capacitance between it and the common electrode CT, which is similarly made of ITO. Another example of the transparent conductive material other than ITO is indium-zinc-oxide (IZO), with which similar results are also obtainable as readily understandable by those skilled in the art to which the invention pertains.

The counter electrode CT is made of ITO and is connected at the same layer level to the common line CL. An arrangement is made causing a common voltage to be applied to the counter electrode CT.

With this arrangement example, the common voltage is set at a selected potential level which is lower by a specific voltage than an intermediate direct current (DC) voltage between a drive voltage of the minimum level being applied to the drain line DL and a drive voltage of the maximum level, the specific voltage being equivalent to a feed-through voltage occurring when letting the thin-film transistor TFT turn off.

Figure 8:
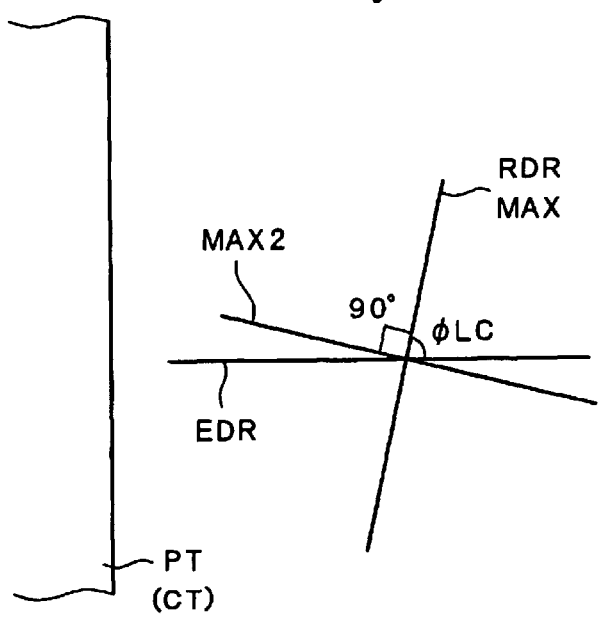
FIG. 8 is a diagram for explanation of alignment directions of alignment films that are deposited to be in contact with a liquid crystal layer as interposed between a couple of upper and lower substrates constituting the liquid crystal display device of the invention.

FIG. 8 is a diagram for explanation of alignment directions of alignment films, each of them being coated, that are deposited to be in contact with a liquid crystal layer as interposed between a couple of upper and lower substrates constituting the liquid crystal display device of the invention. The alignment films may be made of polyimide. Initial alignment directions RDR are rendered parallel with each other at the upper and lower substrates. Typical methods for adding the initial alignment directions include but not limited to a rubbing method and an oblique or diagonal vapor deposition method, wherein the rubbing is widely used today.

The relation of an initial alignment direction RDR versus an applied electric field direction EDR is as shown in FIG. 8. Here, the initial alignment direction RDR is set at an about 75° with respect to the horizontal direction. Note that in the arrangement using a liquid crystal composition with positive dielectricity anisotropy, the angle formed between the initial alignment direction RDR and the applied electric field direction EDR must be greater than or equal to 45° and yet less than 90°. The alignment films are each formed to have a thickness of 20 to 300 nm (in this embodiment, about 100 nm).

Optical polarization plates are laminated on respective surfaces of two substrates. Polarization plates having electrical conductivity are used as polarizer plates POL1, POL2 as will be set forth later with reference to FIGS. 10A and 10B, wherein the lower side polarizer plate POL1 is designed so that its polarized light transmission axis MAX1 is identical to the initial alignment direction RDR whereas the upper side polarizer plate POL2 is such that its polarized light transmission axis MAX2 is at right angles thereto.

With such an arrangement, it is possible to obtain the required normally-close characteristics that the transmissivity increases with an increase in a voltage being applied to the pixel of the present invention (i.e. voltage between the pixel electrode PX and counter electrode CT). It is also possible to attain black display of good quality upon application of no voltages thereto.

Additionally, letting the polarizer plates have electrical conductivity results in preclusion of display defects otherwise occurring due to externally applied static electricity and also in establishment of an EMI remedy. Regarding the conductivity, as far as the remedy for influence due to static electricity concerned, it is preferable that the sheet resistivity measures $10^8 \Omega/\square$ or less; if the EMI remedy is additionally required then the sheet resistivity is preferably set at $10^4 \Omega/\square$ or less. Optionally a conductive layer may be provided on the back face (surface to which a polarizer plate is to be adhered) of a glass substrate opposite to the liquid crystal material interposition surface thereof.

Figure 9:
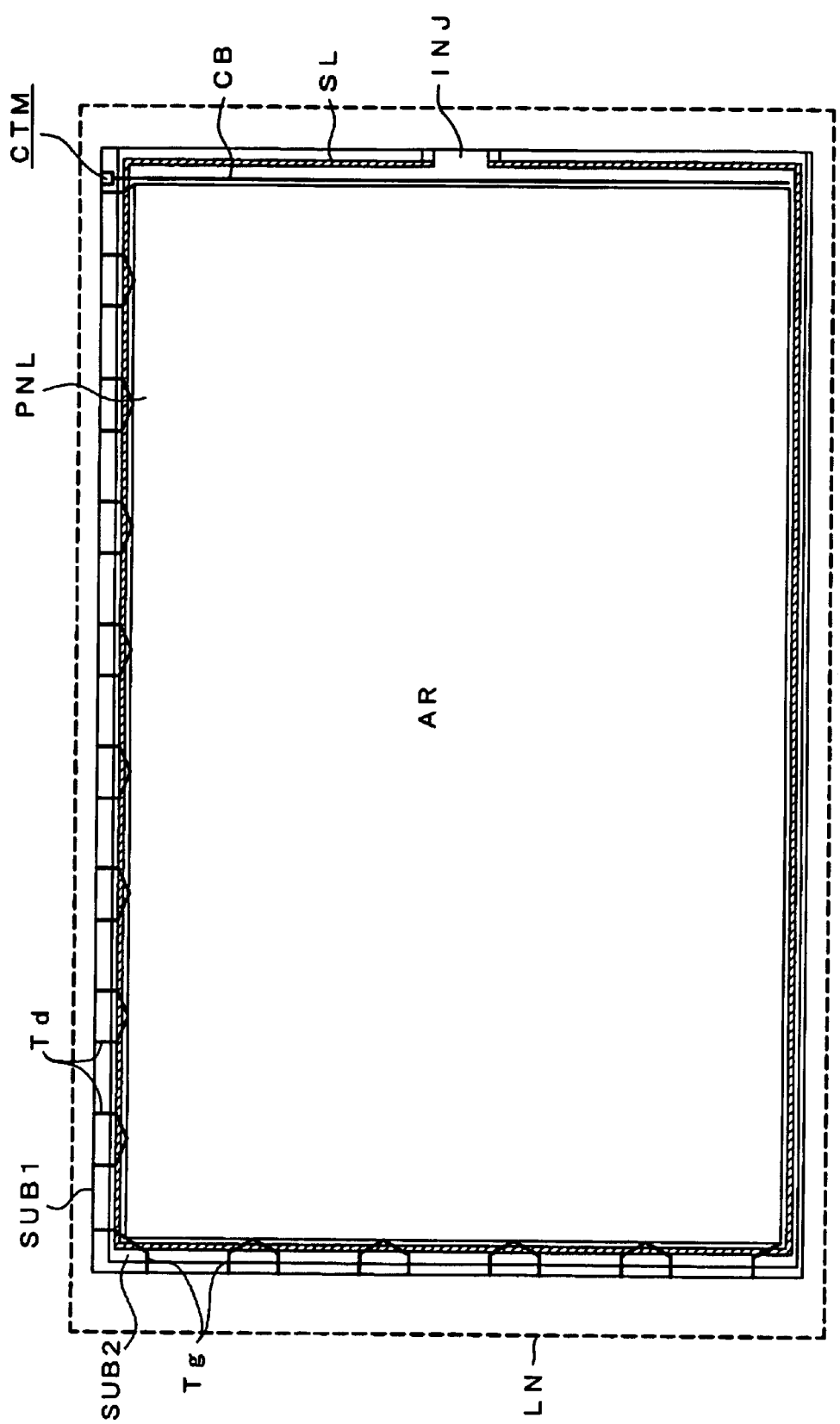
FIG. 9 is a plan view of main part of a display panel including the upper and lower glass substrates, which part is around a matrix section thereof.
Figure 10A:
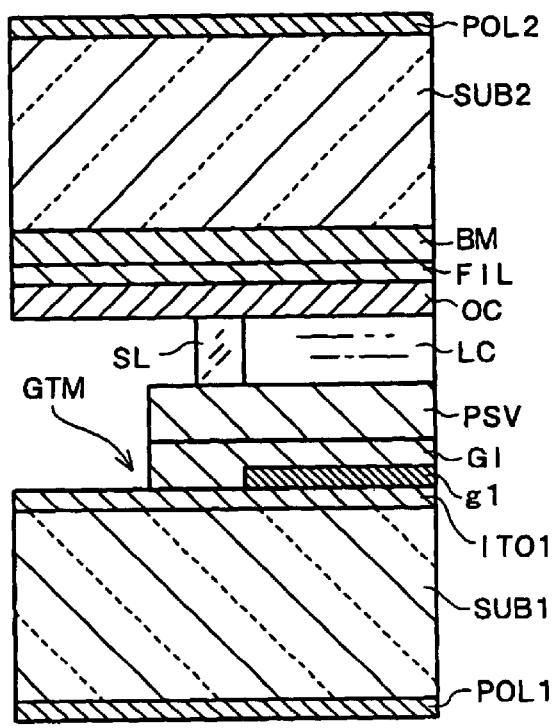
Figure 10B:
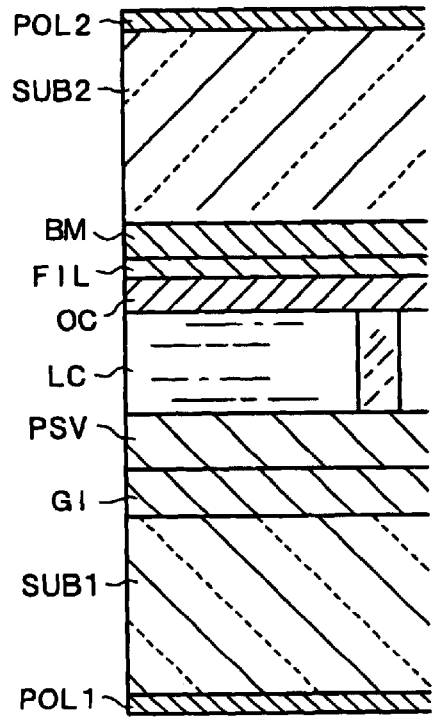
FIG. 10B is a diagram showing in cross-section another part near a seal section of the display panel PNL whereat the external connection terminal is absent.

FIG. 9 is a plan view of main part of a liquid crystal display device display panel PNL including the upper and lower glass substrates SUB1, SUB2, which part is at limb portions of a matrix (AR) thereof. FIG. 10A is a diagram showing a cross-section of part of the display panel PNL which is near an external connection terminal GTM to which scanning circuitry of the panel is to be connected, and FIG. 10B is a diagram showing in cross-section another part near a seal section of the display panel PNL whereat no external connection terminals are present.

In the manufacture of this liquid crystal display device, if it is small in size then a single glass substrate (also called a "mother glass") with a plurality of devices processed together simultaneously thereon is subdivided into portions for improvement in throughput; if it is large in size then a processed glass substrate of a standardized size for common use as any product types is made smaller into an appropriate size adaptable for use with respective types.

In either case, the glass is cut after completion of a series of process steps required. FIGS. 9 and 10A–10B show an example of the latter case, each of which diagrams indicates the resultant structure with the upper and lower substrates SUB1, SUB2 having been cut (after being cut out of the mother glass). A broken line LN in FIG. 9 designates an edge before cutting of the both substrates.

In either case, in the completed state, portions at which external connection terminal groups Tg, Td and terminal CTM exist (upper and left side edges in FIG. 9) are such that the upper side substrate SUB2 is inwardly limited in size so that its size is less than that of the lower side substrate SUB1 thereby letting the terminals be exposed.

A respective one of the terminal groups Tg, Td is the one in which a plurality of terminals including scan circuit connection terminals GTM and drain signal circuit connection terminals DTM plus lead wire sections thereof are bundled together in units of tape carrier packages TCP (see FIG. 16) with integrated circuit chips CHI (see FIG. 16) mounted thereon.

Lead wires of each group extending from the matrix section up to the external connection terminal section are inclined as they approach the both ends. This is done in order to let the terminals DTM, GTM of the display panel PNL be identical with the layout pitch of the packages TCP and the connection terminal pitch at each package TCP.

In addition a common terminal CTM is the terminal used to give a common voltage to the common electrode CT from external circuitry. Common lines CL of the matrix section are railed toward the opposite side (right side in FIG. 9) of the gate use terminals GTM, wherein respective common lines are bundled together at a common bus line CB for connection to the common terminal CTM.

A seal pattern SL is formed between the transparent glass substrates SUB1, SUB2 along the edges thereof excluding a liquid crystal sealing port INJ for sealing therein a layer of liquid crystal material LC. An example of the seal material is epoxy resin. Layers of orientation or alignment films ORI1, ORI2 are formed inside of the seal pattern SL. Polarizer plates POL1, POL2 are arranged on outside surfaces of the lower transparent glass substrate SUB1 and upper transparent glass substrate SUB2, respectively. The liquid crystal LC is sealed into a region that is partitioned by the seal pattern SL between the lower alignment film ORI1 and upper alignment film ORI2 for setting directions of liquid crystal molecules. The lower alignment film ORI1 is formed over a protective film PSV on the lower transparent glass substrate SUB1 side.

This liquid crystal display device is assembled by the method including the steps of laminating a variety of layers over each other independently on the lower transparent glass substrate SUB1 side and upper transparent glass substrate SUB2 side, forming the seal pattern SL on the substrate SUB2 side, and superposing the lower transparent glass substrate SUB1 and upper transparent glass substrate SUB2 each other. And the liquid crystal LC is injected from the opening INJ of the seal material SL; the injection port INJ is then sealed by epoxy resin or the like; thereafter, the upper and lower substrates are cut into adequate sizes.

FIGS. 11A and 11B are explanation diagrams of a connection structure covering from the gate line GL up to its associated external connection terminal (gate terminal) GTM in FIG. 9. FIG. 11A shows a planar structure thereof whereas FIG. 11B depicts a sectional view of the structure as taken along line B—B of FIG. 11A.

Note that FIG. 11 corresponds to one terminal included in the terminal group Tg shown at left side edge of the substrate SUB1 of FIG. 9, wherein its oblique lead wire portion is represented by a straight line shape for convenience sake. Hatching is used to indicate a Cr—Mo layer g1 of FIG. 11B for purposes of facilitating visual understanding thereof.

The gate terminal GTM consists essentially of a Cr—Mo layer g1 and a transparent conductive layer ITO1 that protects the layer surface and also improves the reliability of connection with a tape carrier package (TCP) associated therewith.

This transparent conductive layer ITO1 employs a transparent conductive film ITO. As shown in FIG. 11B, a dielectric film GI and protective film PSV are formed on the right side of FIG. 11B, wherein a terminal section GTM placed at a left side edge is exposed from the dielectric film GI and protective film PSV for enabling establishment of electrical contact with external circuitry associated therewith.

Although only one pair of the gate line GL and gate terminal GTM is shown in FIGS. 11A and 11B, actually a plurality of line pairs each similar to the pair are laid out to make up a terminal group, wherein the illustrative left end of the gate terminal GTM is extended beyond the cutaway region of a substrate during manufacturing process and is then electrically shorted by a shorting lead SHg (not shown). Due to shorting by this shorting lead, it will be useful for prevention of unwanted static electrostatic destruction or breakdown of the alignment film ORI1 during rubbing processes or the like.

Figure 12A:
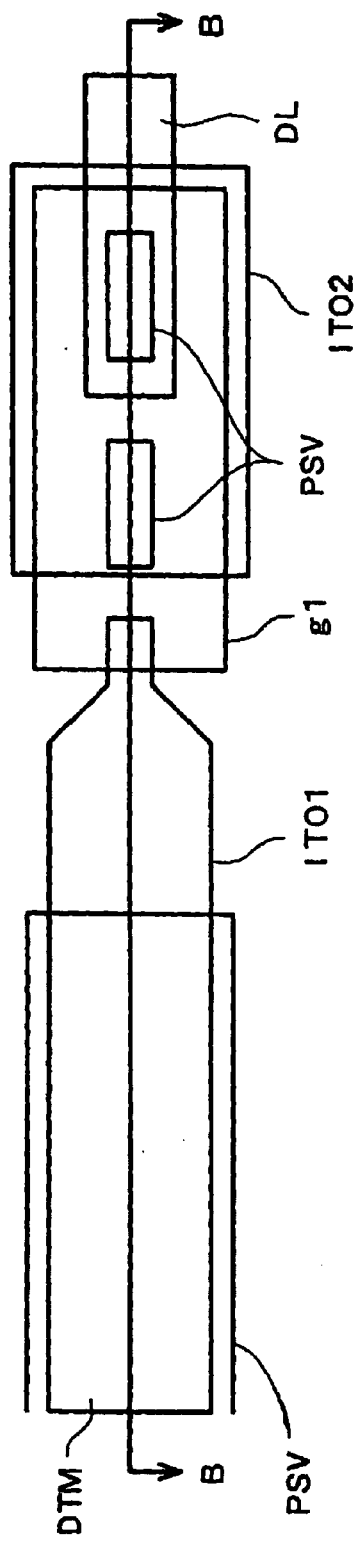
Figure 12B:
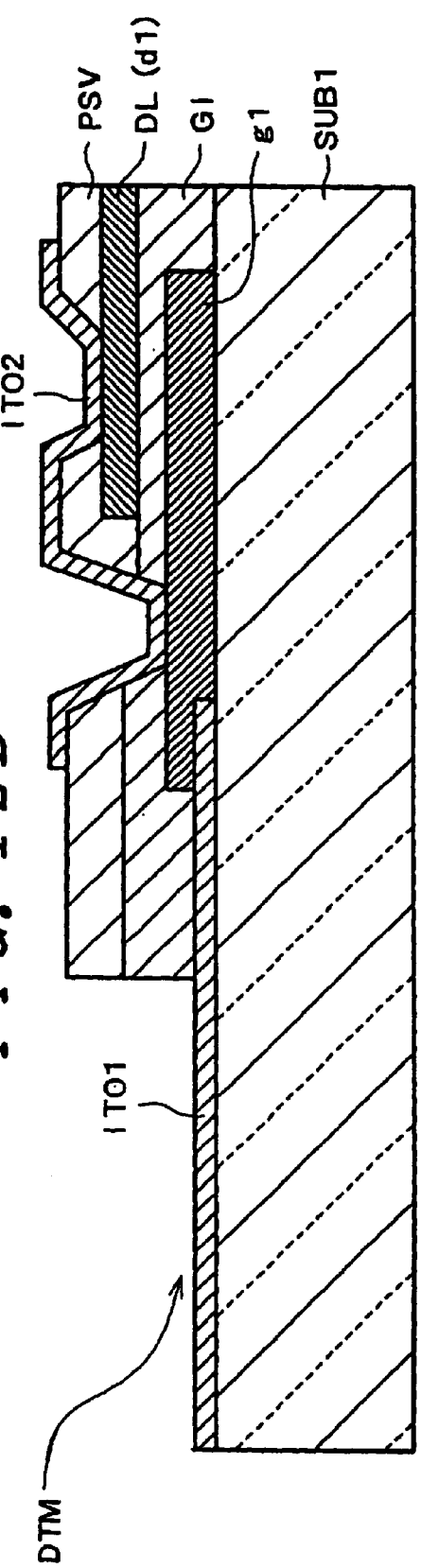

FIGS. 12A and 12B are explanation diagrams of a connection structure covering from a drain line DL up to its associated external connection terminal DTM. FIG. 12A shows a planar structure thereof, and FIG. 12B depicts a sectional view of the structure as taken along line B—B of FIG. 12A. Note that FIGS. 12A and 12B correspond to one terminal as included in the terminal group Td shown at the upper end of the substrate SUB1 of FIG. 9.

Figure 16:
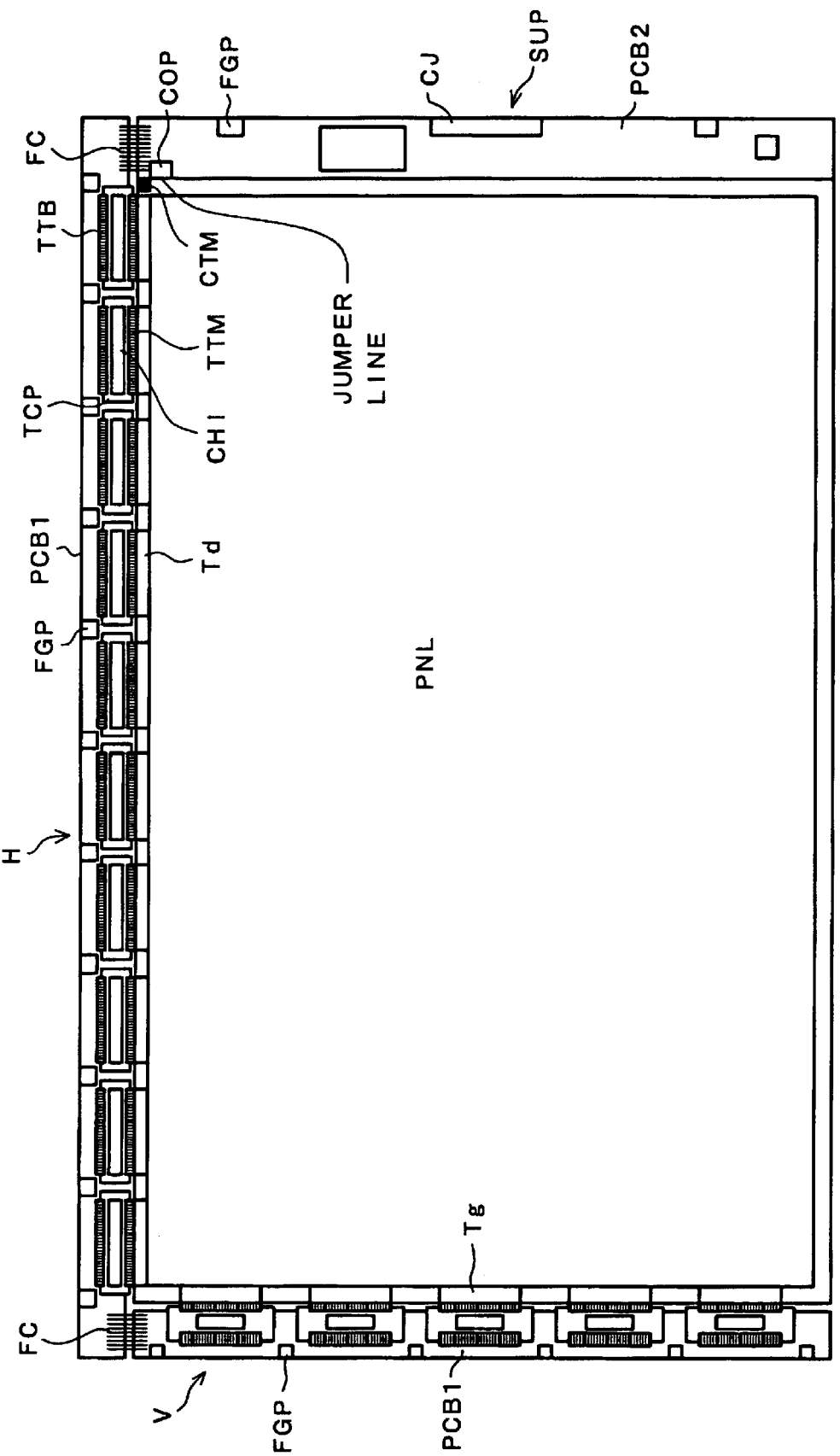
FIG. 16 is a diagram depicting a plan view of the display panel shown in FIG. 9 in the state that drain drivers (image signal drive circuits) and gate drivers (vertical scanning circuits) are connected thereto.
Figure 17:
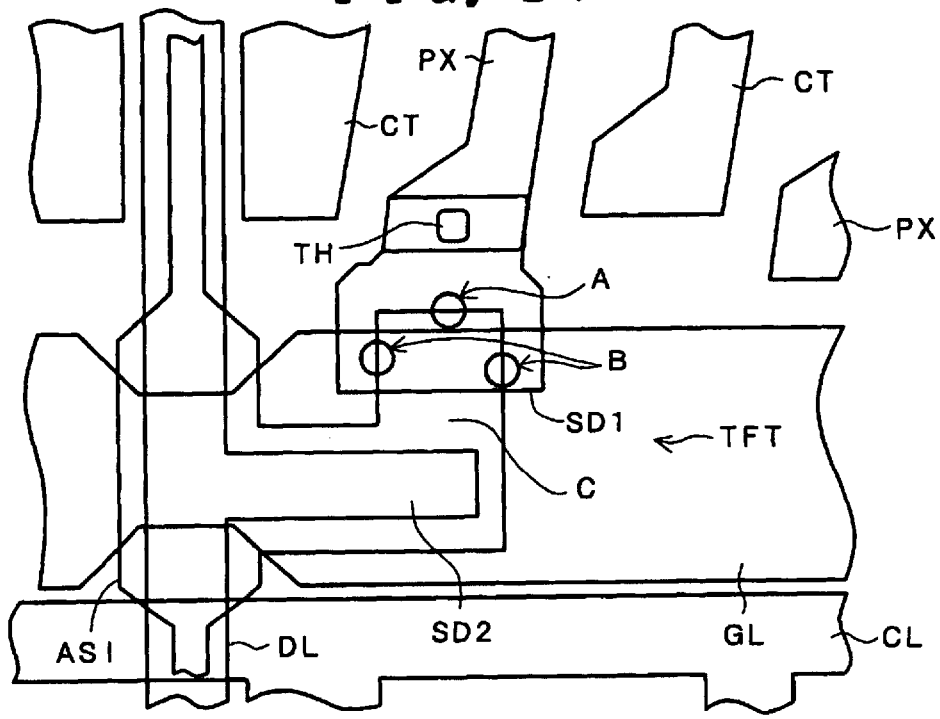
FIG. 17 is a diagram pictorially showing an enlarged plan view of main part of one exemplary IPS type liquid crystal display device, which part includes a thin-film transistor section.
Figure 18:
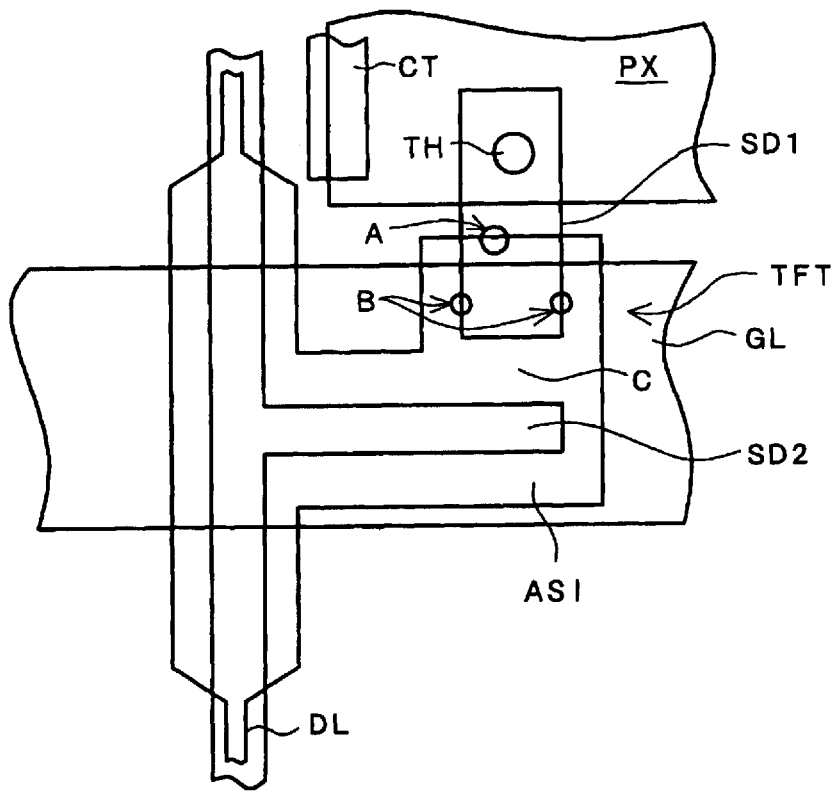
FIG. 18 is a diagram pictorially showing an enlarged plan view of main part of another exemplary IPS type liquid crystal display device, including a thin-film transistor section.

External connection terminals DTM are laid out in the horizontal direction of the display panel PNL as shown in FIG. 16 to thereby make up a terminal group Td: in FIG. 9, they are further extended to go beyond the cutaway line of the substrate SUB1. During manufacturing process, these external connection terminal DTM are extended beyond the substrate's cut region and are entirely shorted together by more than one shorting lead (not shown) for the purpose of preclusion of electrostatic destruction during manufacturing processes.

The external connection terminals DTM are formed of a transparent conductive layer ITO1 and are connected to drain lines DL at a part from which the protective film PSV1 has been removed. This transparent conductive film ITO1 uses a transparent conductive film ITO which is similar to that of gate-side external connection terminals GTM. Wiring leads spanning from a display region (matrix section) up to the external connection terminals DTM are configured such that a layer d1 is constituted which is at the same level as the drain lines DL.

Figure 13A:
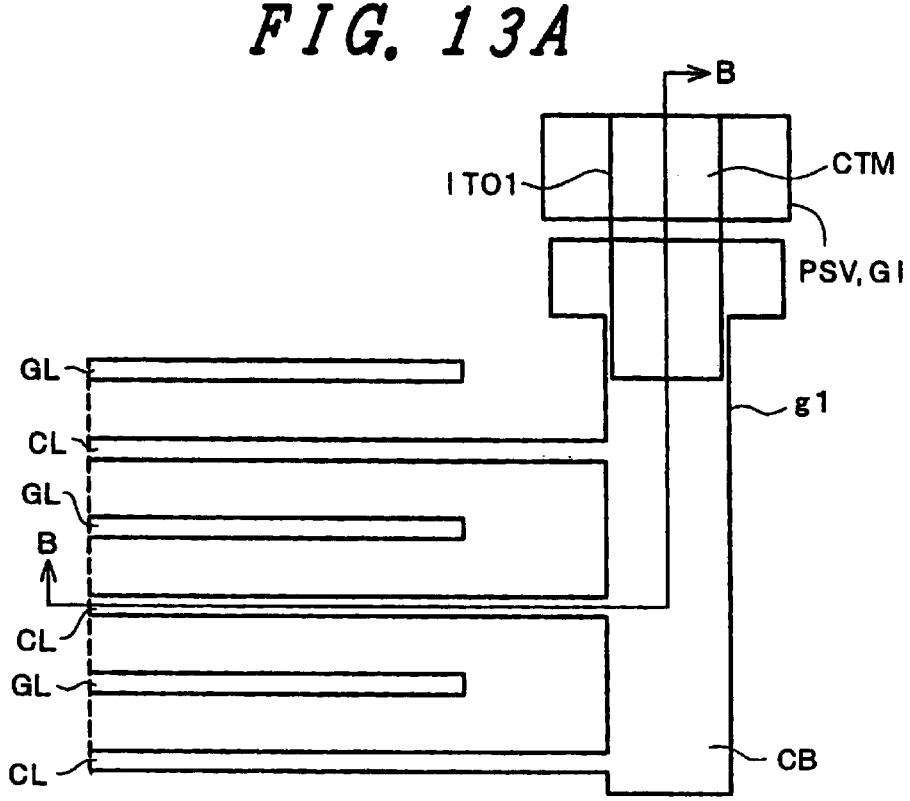
Figure 13B:
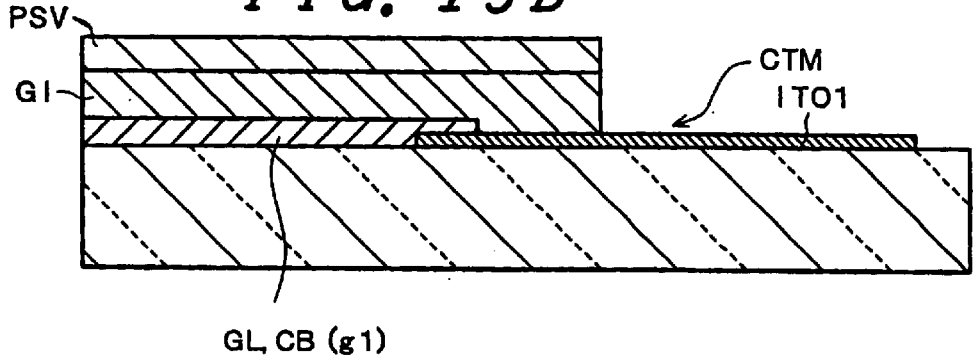

FIGS. 13A and 13B are explanation diagrams of a connection structure covering from common lines CL up to an external connection terminal CTM thereof. FIG. 13A shows a planar structure thereof, and FIG. 13B depicts a sectional view of the structure taken along line B—B of FIG. 13A. Additionally, FIG. 13A corresponds to nearby part of the external connection terminals CTM shown at an upper left portion of FIG. 9.

Respective common lines CL are bundled together at a common bus line CB for connection to the external connection terminal CTM. The common bus line CB is structured so that a conductive layer g3 (not shown) is laminated over the conductive layer g1, these layers being electrically connected together by a transparent conductive layer ITO1.

This is done in order to reduce the resistivity of the common bus line CB, thus enabling a common voltage to be sufficiently supplied from external circuitry to each common line CL. A significant feature of the illustrative structure lies in an ability to lower the common bus line resistivity without having to newly add any extra conductive layers thereto.

The external connection terminal CTM is arranged so that a transparent conductive layer ITO1 is laminated over conductive layer g1. This transparent conductive layer ITO1 uses a transparent conductive film ITO as in the other external connection terminals.

The transparent conductive layer ITO1 of good durability covers the conductive layer g1 to thereby protect its surface while at the same time preventing occurrence of undesired electrolytic corrosion or else.

Connection between the transparent conductive layer ITO1 and the conductive layer g1 and conductive layer d1 is such that conduction is taken by forming a through-hole extending through the protective film PSV and dielectric film GI.

Figure 14:
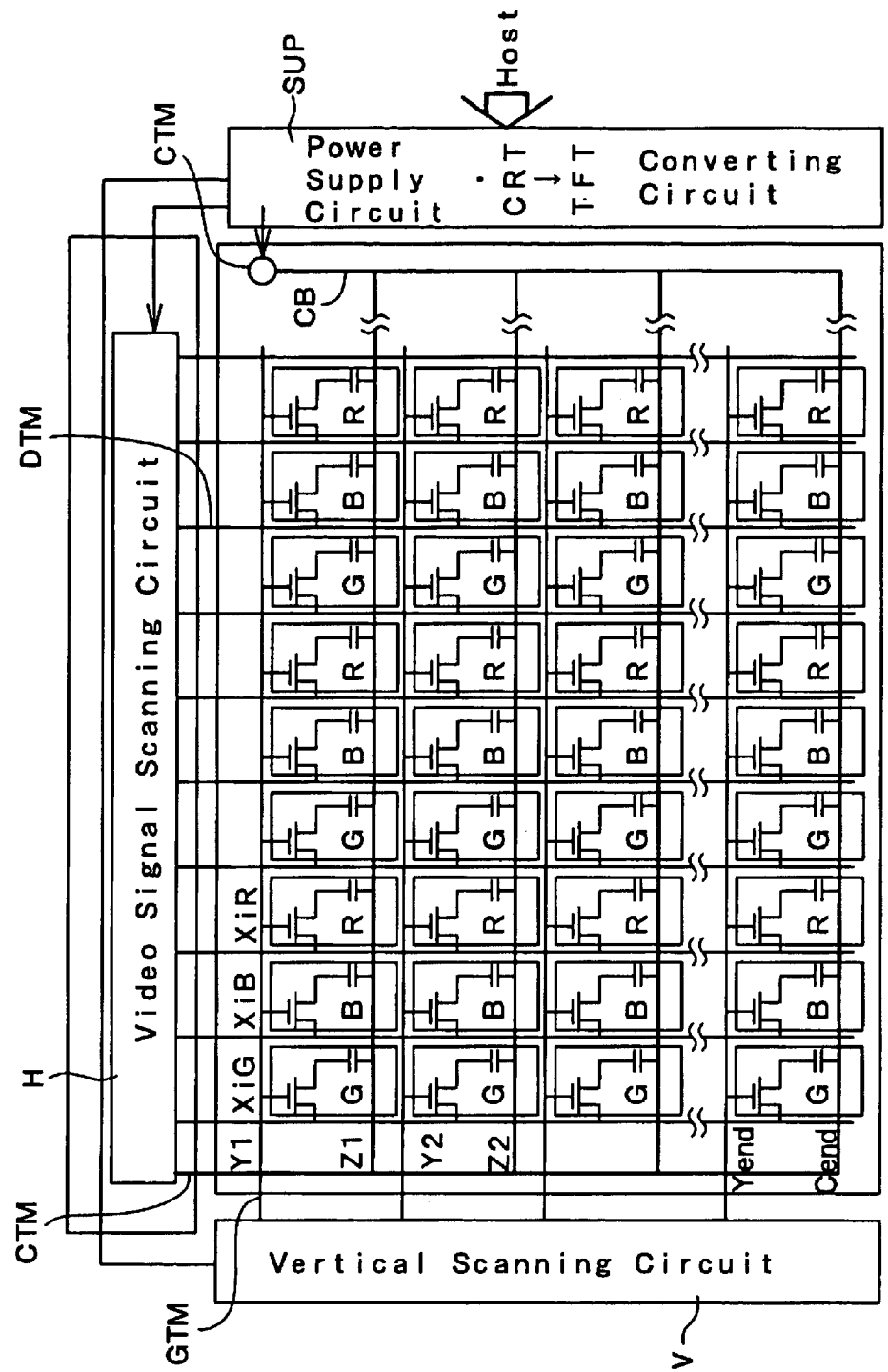
FIG. 14 is a diagram showing electrical connection of equivalent circuitry of a display region (matrix section) and peripheral circuitry thereof.

FIG. 14 is a diagram showing electrical connection of equivalent circuitry of a display region (matrix section) and peripheral circuitry operatively associated therewith. Although FIG. 14 is a circuit diagram, the circuitry is depicted in a way corresponding to the actual geometric layout.

The matrix section arranged in the display region is formed of a matrix array of a plurality of pixels that are laid out in a two-dimensional manner. In FIG. 14, reference character "X" means drain lines DL with suffices "G," "B" and "R" added thereto in a way corresponding to green, blue and red, respectively. "Y" means gate lines GL with suffices "1," "2," "3," ..., "end" added thereto in accordance with the order of scanning timing.

The gate lines Y (suffices omitted) are connected to gate drivers (vertical scanning circuits) V whereas the drain lines X (suffices omitted) are connected to drain drivers (image signal drive circuits) H. "SUP" is circuitry that includes a circuit for converting display information for use with a cathode ray tube (CRT) incoming from either a power supply circuit for obtaining a plurality of potentially stabilized divided voltage sources from a single voltage source or a host (upper-level arithmetic processing device) into display information adaptable for use with a TFT liquid crystal display device.

Figure 15:
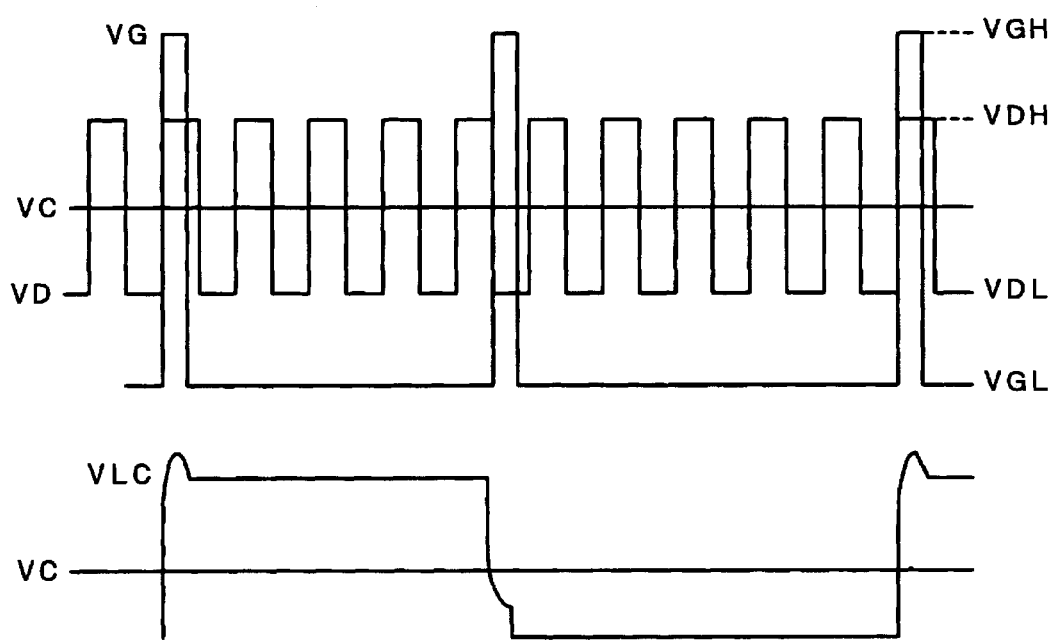
FIG. 15 is a drive signal waveform diagram of the liquid crystal display device shown in FIG. 14.

FIG. 15 is a drive signal waveform diagram of the liquid crystal display device shown in FIG. 14. A gate signal VG takes an ON level once per scanning period and an OFF level during the other periods. A drain signal voltage VD is applied in such a way that it is two times greater in amplitude than a voltage to be applied to the liquid crystal layer and then transferred to a single pixel while letting the positive polarity and negative polarity be inverted in units of frames.

Here, the drain signal voltage VD inverts its polarity in units of columns of the pixel matrix and also inverts it on a per two-column basis. This provides an arrangement in which polarity-inverted pixels neighbor each other in up-down and right-left directions (dot-inversion drive), which in turn makes it possible to minimize risks of flicker and crosstalk (smear) occurrence.

In addition, a common voltage VC is set at a voltage that is potentially lower by a fixed level than a center voltage of the polarity inversion of the drain signal voltage VD. This is to compensate for a feed-through voltage otherwise generating when a thin-film transistor TFT changes from ON to OFF, and is done in order to apply to liquid crystals an alternate current (AC) voltage VLC that is less in DC components (because the liquid crystals become severe in after-image and degradation or the like upon application of a DC voltage thereto).

FIG. 16 is a diagram showing a plan view of the display panel PNL shown in FIG. 9 in the state that drain drivers (image signal drive circuits) H and gate drivers (vertical scan circuits) V are connected thereto.

"CHI" designates drive IC chips for driving the display panel PNL (the lower five ones in FIG. 16 are vertical scan circuit side drive ICs whereas groups each including left ten ones are drain signal drive circuit side drive IC chips).

"TCP" is a tape carrier package with IC chips CHI mounted thereon by tape-automated bonding (TAB) techniques; PCBI is a drive circuit substrate with the above-noted TCP and capacitors and the like being mounted thereon, wherein this substrate is divided into two parts one of which is for use with drain signal drive circuitry and the other of which is for gate signal drive circuitry.

FGP is a frame ground pad, to which a spring-like fragment as provided and cut into a shield case SHD is soldered. FC is a flat cable used to electrically connect together a lower side drive circuit substrate PCBI and left side drive circuit substrate PCBI.

Preferably the flat cable FC is arranged so that a plurality of lead lines (made of phosphor bronze raw material with Sn-plating applied thereto) are sandwiched and supported between a stripe-shaped polyethylene layer and a polyvinyl alcohol layer.

With the above-stated embodiment arrangement, it is possible to suppress undesired creation of photoconduction currents while simultaneously enabling prevention of cracking and/or open circuiting at source/drain electrodes.

As has been explained above, in accordance with the present invention, it is possible to provide the liquid crystal display device of high reliability which is capable of suppressing creation of photoconduction currents and thin-film transistor leak currents and also reduction of signal hold signals while at the same time preventing occurrence of cracks and opencircuit of the source/drain electrodes to thereby achieve high quality and high manufacturing yields.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device comprising:
a pair of substrates at least one of which is transparent and between which a liquid crystal layer is interposed; a plurality of gate lines and a plurality of drain lines being formed on an inner surface of one of the pair of substrates;
a thin film transistor being disposed at an intersecting portion of one of the plurality of gate lines and one of the plurality of drain lines;
a pixel electrode being connected to the thin film transistor;
a counter electrode being disposed opposite to the pixel electrode;
wherein each of the gate lines has a dimension in a direction of an extension direction of the drain lines which is substantially constant between adjacent drain lines;
an edge portion of a semiconductor layer situated under a source electrode of the thin film transistor is arranged within an edge of the gate line situated under the semiconductor; and
the semiconductor layer has a first portion and a second portion, a dimension of the first portion in the extension direction of the drain lines being narrower than a dimension of the second portion in the extension direction of the drain lines.

2. A liquid crystal display device according to claim 1, wherein a width of the second portion in an extension direction of the gate lines at a position where the semiconductor layer is situated under the source electrode is broader than that of the source electrode.

3. A liquid crystal display device according to claim 1, wherein the semiconductor layer of the thin film transistor is separated from a semiconductor layer being disposed at the intersection portion of the gate line and the drain line.

4. A liquid crystal display device according to claim 3, wherein the thin film transistor has a drain electrode branching off from the one of the plurality of drain lines at a location outside the gate line situated under the semiconductor layer, covering a corner of the semiconductor layer at a side of the one of the plurality of drain lines, and extending over the semiconductor layer, and
the semiconductor layer has two directional getting over portions where the drain electrode gets over an edge of the semiconductor layer in two different directions with respect to an extension direction of the drain electrode.

5. A liquid crystal display device according to claim 3, wherein the semiconductor layer of the thin film transistor has three directional getting over portions where the drain electrode and the source electrode gets over an edge of the semiconductor layer in three different directions with respect to respective extension directions thereof.

6. A liquid crystal display device comprising:
a pair of substrates at least one of which is transparent and between which a liquid crystal layer is interposed;
a plurality of pixel regions being disposed in a matrix manner along a first direction and a second direction transverse to the first direction on an inner surface of one of the pair of substrates, each of which has a gate electrode, an insulating layer being formed over the gate electrode, a semiconductor layer being formed on the insulating layer, source and drain electrodes being formed on the semiconductor layer and spaced from one another, and a pixel electrode being connected to one of the source and drain electrodes;
a plurality of gate signal lines a respective one of which is connected to the gate electrode of each of the pixel regions being arranged along the first direction; and
a plurality of video signal lines a respective one of which is connected to another of the source and drain electrodes of each of the pixel regions being arranged in the second direction,
wherein each of the gate lines has a dimension in a direction of an extension direction of the video signal lines which is substantially constant between adjacent video signal lines;
the semiconductor layer is formed within a contour of the gate electrode in each of the pixel regions; and
the semiconductor layer has a first portion and a second portion, a dimension of the first portion in the extension direction of the video signal lines being narrower than a dimension of the second portion in the extension direction of the video signal lines.

7. A liquid crystal display device according to claim 6, wherein each of the plurality of video signal lines are formed on another semiconductor layer being formed so as to be spaced from the semiconductor layer of each of the pixel regions.

8. A liquid crystal display device according to claim 6, further comprising a counter electrode being formed on an inner surface of another of the pair of substrates, wherein each of the pixel electrodes is opposite to the counter electrode across the liquid crystal layer.

* * * * *